April 9, 1968 — R. L. AMRINE — 3,376,663
FISHING LURE
Filed July 26, 1965

INVENTOR.
ROBERT L. AMRINE
BY MAHONEY, MILLER & RAMBO
BY *Wm. V. Miller*
ATTORNEYS

United States Patent Office 3,376,663
Patented Apr. 9, 1968

3,376,663
FISHING LURE
Robert L. Amrine, Richwood, Ohio
(647 R St., Renton, Wash. 98055)
Filed July 26, 1965, Ser. No. 474,876
2 Claims. (Cl. 43—42.02)

ABSTRACT OF THE DISCLOSURE

A fishing lure having a main body portion and appendages formed integrally from resiliently flexible material and have a covered spring steel wire frame embedded therein. A guide tube extends longitudinally through the main body and a line extends through the guide and is connected at one end to the frame at points on the appendages spaced from the main body for remotely controlling the flexing of the appendages. A float, weight and scoop are attached to the main body to enhance the action of the lure.

---

It is the objective of this invention to provide a fishing lure which is characterized by its resemblance to a creature upon which fish normally feed and, therefore, advantageously attractive. This lure, when pulled through the water in a specific manner, will function and operate in simulation of the life-like motions produced by a creature which it resembles. For illustrative purposes in this application, the invention is embodied in a structure resembling a frog. This illustration of the frog-type lure is not to be considered a limitation as it is contemplated that the invention may be embodied in other structures resembling several types of aquatic creatures. This and other objects of the invention will be readily apparent from the following detailed description of the embodiment thereof and the accompanying drawings.

Detailed description of drawings

Figure 1:
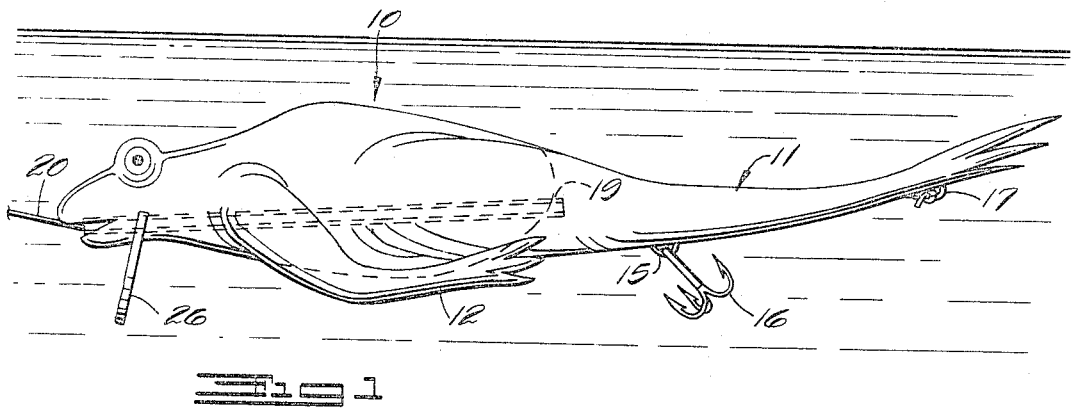
FIGURE 1 is a side elevational view of the fishing lure embodying this invention as positioned in a body of water.

Having reference to the drawings, a fishing lure embodying this invention is shown in detail in the several figures of the drawing. In these figures, the fishing lure is in the form of a frog and is constructed to resemble the frog in a natural swimming configuration to be more advantageously attractive to a fish. As such, the fishing lure comprises a body structure having a main body portion 10 and a pair of elongated, resiliently flexible appendages 11 which resemble the feet or leg portions. In addition to the leg portions or appendages 11, which extend outwardly from the main body portion 10 at one end thereof, there are a pair of forearm resembling appendages 12. The forearm appendages 12 are attached to the main body portion 10 near the forward marginal end. The body structure may be advantageously formed by a molding process utilizing a suitable material, such as a silicone elastomer. This material may be obtained in a form having the desired resiliently flexible characteristics and may be readily formed into the desired structure by well-known molding processes.

To further enhance the resilient characteristics of the body structure and, in particular, the leg simulating appendages 11, an elongated, resilient wire is formed into a structural skeleton which is adapted to be internally embedded in the leg portions 11 and the main body portion 10. The skeleton-forming wire may be formed from a spring steel and is preferably shaped as clearly illustrated in FIGURE 2. As such, the spring steel skeleton wire extends from the terminal end portion of each of the leg-forming appendages 11 toward the center of the main body portion 10 where both leg sections are joined. Each of the leg sections of the skeleton structure 13 is formed with a closed loop 15 which projects exteriorly of the body structure for attachment of the barbed fish-hooks 16. Each of the hook-engaging loops 15 is formed at that portion of the leg appendages 11 which approximates the knee section. The free ends of the spring steel wire 14 forming the skeleton structure 13 embedded in the terminal ends of the leg appendages 11 are also formed with a closed loop 17 which projects exteriorly of the body structure. To facilitate embedment of the spring steel wire 14 in the silicone elastomer material from which the body structure is formed, the entire wire from which the skeleton structure 13 is formed is wrapped with a porous or filamentary material in the form of elongated strips 18. The strips of material 18 are spirally wound onto the wire 14 with the exception of the loops 15 and 17. The material 18 improves the adhesion of the silicone elastomer from which the body structure is formed to the wire 14.

Also molded internally of the main body portion 10 is an elongated, substantially rigid tube 19 which forms a guide for axial movement of an actuating filament 20 therethrough and provides additional rigidity for the main body portion. The tube 19 extends longitudinally of the main body portion 10 and opens at each end thereof. The forward end of the tube 19 may terminate within a mouth structure formed in the main body portion 10. A suitable synthetic resin material may be utilized in the formation of the tube 19 which will adhere to the silicone elastomer from which the main body portion 10 is formed. As can be best seen in FIGURE 2, the skeleton structure 13 is formed in two parallel sections 13a disposed adjacent the tube 19 and which are connected by an arcuately curved portion 21. The parallel sections 13a extend axially of the tube 19 and are in contacting engagement therewith while the arcuately curved section 21 extends around the tube.

The actuating filament 20 comprises an elongated section of flexible line, such as might constitute a leader and is adapted to be connected at one end to the fishing line itself. This connection is not shown in the several figures of the drawing. The filament 20 extends axially through the tube 19 and is secured to the loop 17 at the terminal end of one of the leg appendages 11. An auxiliary filament section 22 connected to the loop 17 of the opposite leg appendage 11 is tied into the actuating filament 20 at a point intermediate the terminal end of the tube 19 and the loop 17 as at 23. Thus, the filament 20 will actuate both of the leg portions or appendages 11.

Figure 2:
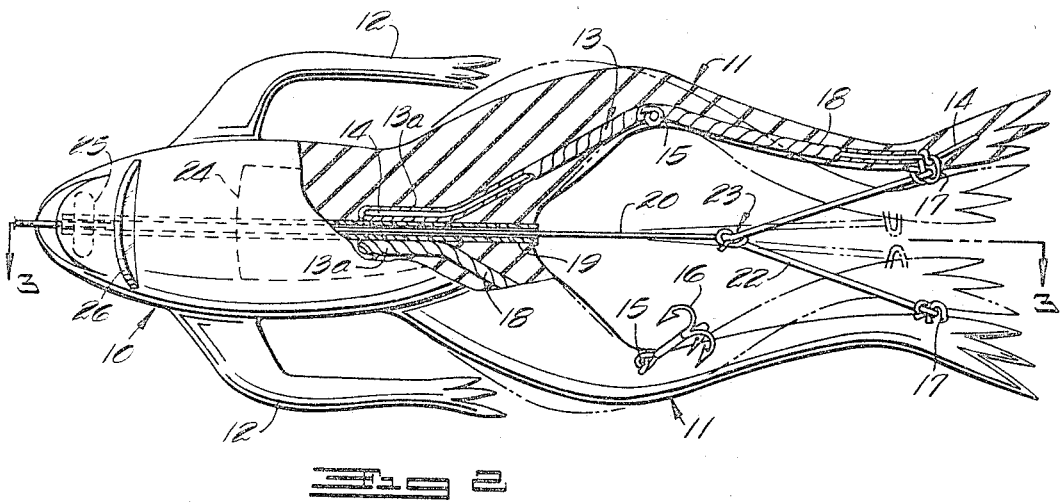
FIGURE 2 is a bottom plan view of the fishing lure which is partially sectioned to more clearly illustrate the internal structure of the device.
Figure 3:
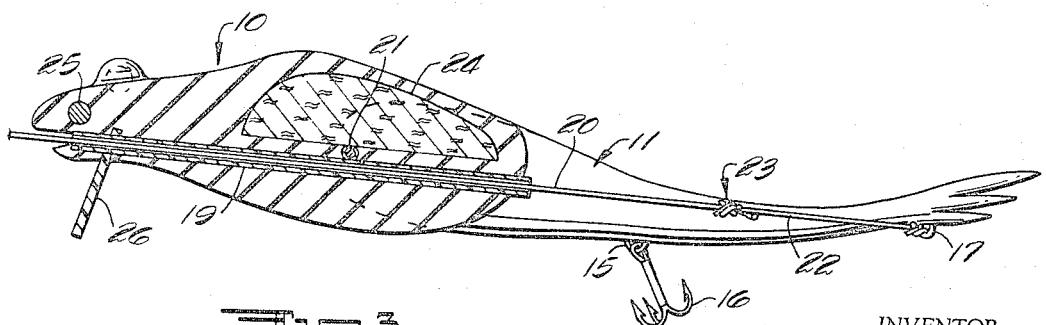
FIGURE 3 is a medial, longitudinal sectional view of the lure taken along line 3—3 of FIGURE 2.

The operation of the fishing lure is diagrammatically illustrated in FIGURE 2. With the fishing lure immersed in a body of water and with the forward end of the actuating filament 20 connected to the fishing line and associated fishing equipment, a pull or sharp tug on the line will result in flexing of the leg appendages 11 to substantially the broken line position as shown in FIGURE 2. This flexing results from the inertia of the lure and resistance to movement of the fishing lure through the water opposing the force produced by a pull on the line or actuating filament 20. The body structure and embedded skeleton structure 13 are formed to have a resilient characteristic which may be overcome by a sharp tug on the actuating line 20 to produce the flexing movement of the leg appendages 11. As indicated in FIGURE 2, the flexing movement will draw the terminal end portions of the leg appendages together simulating the swimming action of the legs of a frog. Subsequent to the application of pull, the leg forming appendages 11 will return to their normal, unflexed configuration.

To improve the weight and balance characteristics of the present embodiment of the fishing lure, a cork-type float 24 and a lead sinker 25 are also embedded in the main body portion 10. The cork float 24 is positioned at substantially the center of gravity of the body structure and is of an appropriate size to form a body size which displaces a quantity of water substantially in weight to the weight of the lure. The sinker 25 is positioned forwardly of the center of gravity to provide the desired balance of the entire structure. The specific size of the float 24 and the weight of the sinker 25 are determined by the specific structures utilizing the formation of the fishing lure embodying this invention.

To further enhance the life-like action of the fishing lure, a scoop or spoon 26 is secured to the main body portion 10 adjacent the forward end thereof. The spoon 26 comprises a relatively thin, rigid plate which may be formed from a material such as plexiglas and is secured to the main body portion 10 through embedment of a marginal edge portion thereof in the body portion 10. To further increase the rigidity of attachment of the spoon 26, an aperture is formed in the embedded marginal edge portion through which the tube 19 projects. The spoon 26 extends downwardly and is inclined forwardly of the forward end portion of the body. The effect of the spoon 26 and its relative positioning as to the body structure is such that pulling the fishing lure through the water will result in a slight diving motion to further immerse the fishing lure.

Although the present invention is illustrated as embodied in a frog-resembling lure, it is also contemplated that the invention may be embodied in aquatic creatures of several different forms. The frog is, of course, provided with two leg appendages 11; however, the simulating, life-like action may be produced in a lure having only one such appendage but otherwise incorporating a main body portion carrying a guide tube or guide and having a flexible appendage such as the leg portion and an actuating filament extending through the guide tube and connected with the terminal end of the appendage. The specific structure will be determined by the form of the creature desired to be simulated and the construction including the incorporation of a float, a sinker and a spoon will be determined by the specifics of the construction.

It is readily apparent that the novel fishing lure of this invention provides a life-like action in the operation of the lure when immersed in a body of water. This lifelike action may be readily produced by a simple repetitive tugging on the actuating filament which results in flexing of the leg appendages simulating the normal action of the appendages.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A fishing lure comprising a body structure simulating the body of a fish-attracting creature having a main body portion and at least one appendage connected thereto and which is selectively movable relative thereto, said main body portion and appendage connected thereto being formed from a flexible material permitting flexing thereof in simulation of like-like movement of said appendage, a skeleton structure disposed within said main body portion and appendage and which includes a substantially rigid base section disposed in coextensive, reinforcing relationship to the main body portion and a resilient section extending from said base section and through the appendage, at least one barbed, fish-engaging hook attached to said skeleton structure and being carried exteriorly of said main body portion and connected appendage a guide tube extending through said main body portion, and an elongated, flexible filament secured at one end to said resilient section of the skeleton structure in said appendage at a point remote to said main body portion and threaded through said guide tube with an opposite end adapted to be secured to a fishing line whereby a sharp pull on said flexible filament when the lure is immersed in a body of water effects a flexing of said appendage relative to said body portion simulating life-like movement.

2. A fishing lure according to claim 1 wherein a pair of said appendages extend rearwardly from said main body portion in spaced relationship, said filament having a central section extending axially through the guide tube in the main body portion and diverging branches connected to the respective resilient sections of the skeleton structure in said appendages.

References Cited

UNITED STATES PATENTS

| | | | |
|---|---|---|---|
| 1,321,850 | 11/1919 | Rhodes | 43—42.39 X |
| 1,689,541 | 10/1928 | Welch | 43—42.3 |
| 1,888,221 | 11/1932 | Coffin | 43—42.02 |
| 2,690,026 | 9/1954 | King | 43—42.02 |
| 2,763,085 | 9/1956 | Caillier | 43—42.02 |

SAMUEL KOREN, *Primary Examiner.*

WARNER H. CAMP, *Examiner.*